(12) United States Patent
Yang et al.

(10) Patent No.: US 12,068,674 B2
(45) Date of Patent: Aug. 20, 2024

(54) INTEGRATED INDUCTOR AND A POWER CONVERSION MODULE INCLUDING THE INTEGRATED INDUCTOR

(71) Applicant: Delta Electronics (Shanghai) CO., LTD, Shanghai (CN)

(72) Inventors: Haijun Yang, Shanghai (CN); Zengyi Lu, Shanghai (CN); Lijun Zhou, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 229 days.

(21) Appl. No.: 17/588,402

(22) Filed: Jan. 31, 2022

(65) Prior Publication Data

US 2022/0158562 A1    May 19, 2022

Related U.S. Application Data

(60) Continuation-in-part of application No. 16/450,089, filed on Jun. 24, 2019, now Pat. No. 11,349,400.
(Continued)

(30) Foreign Application Priority Data

Jan. 25, 2016    (CN) .......................... 201610049254.1

(51) Int. Cl.
*H02M 1/00*    (2007.01)
*H01F 27/24*    (2006.01)
(Continued)

(52) U.S. Cl.
CPC .......... *H02M 1/0064* (2021.05); *H01F 27/24* (2013.01); *H01F 27/306* (2013.01);
(Continued)

(58) Field of Classification Search
CPC .......... H01F 3/14; H01F 27/24; H01F 27/306; H01F 27/38; H01F 37/00; H02M 1/0043;
(Continued)

(56) References Cited

U.S. PATENT DOCUMENTS 9,406,419 B2 *    8/2016    Njiende T. ............... H01F 41/02
2012/0081204 A1 *    4/2012    Garrity .................... H01F 41/06
                                                                    336/221
(Continued)

FOREIGN PATENT DOCUMENTS

DE    102016201258 A1 *    8/2017

OTHER PUBLICATIONS

Zumel et al., "Magnetic integration for interleaved converters," IEEE Applied Power Electronics Conference, Miami Beach, FL, USA, 2003, pp. 1143-1149 vol. 2, doi: 10.1109/APEC.2003.1179360 (Year: 2003).*
(Continued)

*Primary Examiner* — Fred E Finch, III
(74) *Attorney, Agent, or Firm* — Qinghong Xu

(57) ABSTRACT

An integrated inductor and a power conversion module including the integrated inductor are provided. The integrated inductor includes a magnetic core, the magnetic core including two cover plates, two side columns and two central columns between the two side columns, and two windings wound around the two central columns respectively, forming two inductors. Each operating current flowing through the two windings includes a corresponding high-frequency current component, a phase difference between the high-frequency current components of the operating currents flowing through the two windings is 180 degrees.

15 Claims, 26 Drawing Sheets

Related U.S. Application Data which is a division of application No. 15/414,702, filed on Jan. 25, 2017, now Pat. No. 10,381,934.

(51) Int. Cl.
    *H01F 27/30*     (2006.01)
    *H01F 27/38*     (2006.01)
    *H01F 37/00*     (2006.01)
    *H02M 3/158*     (2006.01)
    *H02M 3/00*     (2006.01)
    *H02M 3/335*     (2006.01)

(52) U.S. Cl.
    CPC .......... *H01F 27/38* (2013.01); *H02M 3/1586* (2021.05); *H01F 37/00* (2013.01); *H02M 1/0043* (2021.05); *H02M 3/01* (2021.05); *H02M 3/335* (2013.01)

(58) Field of Classification Search
    CPC ............. H02M 1/0064; H02M 1/4225; H02M 3/1584–1586
    See application file for complete search history.

(56) References Cited

U.S. PATENT DOCUMENTS

| | | | |
|---|---|---|---|
| 2020/0312595 A1* | 10/2020 | Rippel | H03K 17/51 |
| 2021/0110970 A1* | 4/2021 | Kotani | H01F 27/306 |
| 2021/0193366 A1* | 6/2021 | Wang | H01F 27/24 |
| 2021/0249960 A1* | 8/2021 | Jin | H02M 3/33546 |
| 2022/0208425 A1* | 6/2022 | Lu | H01F 37/00 |

OTHER PUBLICATIONS

Machine translation of DE 102016201258 A1, orig. pub. Aug. 3, 2017. (Year: 2017).*

* cited by examiner

INTEGRATED INDUCTOR AND A POWER CONVERSION MODULE INCLUDING THE INTEGRATED INDUCTOR

CROSS REFERENCE TO RELATED APPLICATIONS

This application is a continuation-in-part of U.S. patent application Ser. No. 16/450,089, filed on Jun. 24, 2019, which is a divisional application of U.S. application Ser. No. 15/414,702, filed on Jan. 25, 2017, now U.S. Pat. No. 10,381,934 and claims priority to Chinese Patent Application No. 201610049254.1, filed on Jan. 25, 2016, the entire contents thereof are incorporated herein by reference.

TECHNICAL FIELD

The present disclosure relates to a multiple parallel-connected resonant converter, an inductor-integrated magnetic element and a transformer-integrated magnetic element.

BACKGROUND

In high power supply application, two or multiple electrical branches connected in parallel are generally employed. In the parallel-connected converter, each branch may further contain magnetic elements, such as inductors or transformers. For example, the converter may use LLC circuit for high efficiency purpose and the magnetic elements may be used in the LLC resonant tank. For greater power, a large number of branches are used in the parallel-connected converter, thus leading to a large number of the magnetic elements and large volume, weight and loss of magnetic elements in the entire power supply. Therefore, how to reduce the number, volume, weight and loss of these magnetic elements becomes an important issue in developing a high power supply with high efficiency and high power density. In a parallel circuit, non-uniform of electrical parameters of the magnetic elements will result in uneven distribution of the power over branches of the circuit, and cause local over heat or high voltage/current stress on devices.

The above information disclosed in the background technology section is only used to facilitate understanding the background of the present disclosure, and thus it may include information which does not construct the prior art well-known by the person skilled in the related art.

SUMMARY

According to an aspect of the present disclosure, an integrated inductor includes a magnetic core. The magnetic core includes an upper cover plate and a bottom cover plate, wherein the upper cover plate is disposed opposite to the bottom cover plate; a first side column and a second side column, provided between the upper cover plate and the bottom cover plate; and a first central column and a second central column, provided between the upper cover plate and the bottom cover plate, wherein the first central column and the second central column are disposed between the first side column and the second side column, and the first side column and the second side column align with the first central column and the second central column; and a first winding and a second winding electrically coupled to each other in parallel, wherein the first winding is wound around the first central column, forming a first inductor, the second winding is wound around the second central column, forming a second inductor, each of the first winding and the second winding has a first terminal and a second terminal. When a reference current flows from the first terminal of the first winding to the second terminal of the first winding, a magnetic field is generated by the reference current on the first central column and the magnetic field has a first magnetic flux direction, and a magnetic field generated by an identical reference current on the second central column has a second magnetic flux direction when the identical reference current flows from the first terminal of the second winding and to the second terminal of the second winding. The second magnetic flux direction is the same as the first magnetic flux direction; wherein a first operating current flowing through the first winding has a first high-frequency current component, and a second operating current flowing through the second winding has a second high-frequency current component, and a phase difference is 180 degrees between the first high-frequency current component and the second high-frequency current component.

According to another aspect of the present disclosure, a power conversion module includes an input side, configured to receive an input voltage; a power conversion circuit, electrically coupled to the input side for converting the input voltage to an output voltage, wherein the power conversion circuit includes two branches electrically parallel to each other, and each branch includes an inductor, a first switch and a second switch, and wherein the inductor, the first switch and the second switch are electrically coupled to a common node; and an output side, configured to output the output voltage from the power conversion circuit. Wherein the inductor of one of the two branches and the inductor of another of the two branches are designed to the integrated inductor according to present disclosure.

According to another aspect of the present disclosure, an integrated inductor includes a magnetic core including an upper cover plate and a bottom cover plate, wherein the upper cover plate is disposed opposite to the bottom cover plate; a first side column and a second side column, provided between the upper cover plate and the bottom cover plate; and N central columns, provided between the upper cover plate and the bottom cover plate, wherein the N central columns are disposed between the first side column and the second side column, and the N central columns align with the first side column and the second side column, N is greater than or equal to three; and N windings electrically coupled to each other in parallel, wherein N windings are wound around the N central columns one by one, forming N inductors, each of the N windings has a first terminal and a second terminal. Wherein a reference magnetic flux direction is defined by a reference current flowing from the first terminal to the second terminal of each of the N windings, the reference magnetic flux directions generated by the identical reference current flowing through the N wingdings one by one are the same. Wherein each operating current flows through one of the N windings includes a corresponding high-frequency current component, a phase difference between high-frequency current components of the operating currents flowing through N windings is 360°/N.

According to another aspect of the present disclosure, a power conversion module includes an input side, configured to receive an input voltage; a power conversion circuit, electrically coupled to the input side for converting the input voltage to an output voltage, wherein the power conversion circuit includes N parallel branches, and each branch includes an inductor, a first switch and a second switch, wherein the inductor, the first switch and the second switch are electrically coupled to a common node, wherein N is equal to or greater than 3; and an output side, configured to output an output voltage. Wherein the N inductors of the N parallel branches are made of the integrated inductor according to present disclosure.

According to an aspect of the present disclosure, a multiple parallel-connected resonant converter is provided, the multiple parallel-connected resonant converter includes a first converter having a first input end and a first output end, wherein the first converter includes a first inductor, a first transformer and a first capacitor, and the first inductor, the first transformer and the first capacitor are connected in series to form a first resonant unit; and a second converter having a second input end and a second output end, wherein the second converter includes a second inductor, a second transformer and a second capacitor, the second inductor, the second transformer and the second capacitor are connected in series to form a second resonant unit, and the second output end is connected with the first output end in parallel. Wherein the first inductor and the second inductor are integrated in a first magnetic element, the first magnetic element includes a first side column, a second side column, a first central column and a second central column, the first inductor includes a first coil, the second inductor includes a second coil, the first coil is positioned around the first central column to form the first inductor, the second coil is positioned around the second central column to form the second inductor, and the first central column and the second central column have a same cross sectional area.

According to another aspect of the present disclosure, a multiple parallel-connected resonant converter is provided, the multiple parallel-connected resonant converter includes: a first converter having a first input end and a first output end, wherein the first converter includes a first inductor, a first transformer and a first capacitor, and the first inductor, the first transformer and the first capacitor are connected in series to form a first resonant unit; and a second converter having a second input end and a second output end, wherein the second converter includes a second inductor, a second transformer and a second capacitor, the second inductor, the second transformer and the second capacitor are connected in series to form a second resonant unit, and the second output end is connected with the first output end in parallel, wherein the first transformer and the second transformer are integrated in a first magnetic element, the first magnetic element includes a first side column, a second side column, a first central column and a second central column, the first transformer includes a first primary coil and a first secondary coil positioned on the first central column, and the second transformer includes a second primary coil and a second secondary coil positioned on the second central column, and the first central column and the second central column have a same cross sectional area.

According to another aspect of the present disclosure, an inductor-integrated magnetic element is positioned, the inductor-integrated magnetic element includes a first inductor and a second inductor which are integrated in a magnetic element, the magnetic element includes a first side column, a second side column, a first central column and a second central column, the first inductor includes a first coil, and the second inductor includes a second coil, the first coil is positioned on the first central column to form the first inductor, the second coil is positioned on the second central column to form the second inductor, the first central column and the second central column are formed with a first opening and a second opening, the first opening and the second opening form a first connection line, the first central column and the second central column form a second connection line, and the first connection line is perpendicular to or parallel with the second connection line, and the first central column and the second central column have the same cross sectional area.

According to another aspect of the present disclosure, a transformer-integrated magnetic element is provided, the transformer-integrated element includes a first transformer and a second transformer which are integrated in a magnetic element, the magnetic element includes a first side column, a second side column, a first central column and a second central column, the first transformer includes a first primary coil and a first secondary coil, and the second transformer includes a second primary coil and a second secondary coil, the first primary coil and the first secondary coil are positioned on the first central column, and the second primary coil and the second secondary coil are positioned on the second central column, The first side column and the second side column are formed with a first opening and a second opening, the first opening and the second opening form a first connection line, the first central column and the second central column form a second connection line, the first connection line is perpendicular to or parallel with the second connection line, and the first central column and the second central column have the same cross sectional area.

According to another aspect of the present disclosure, a multiple parallel-connected converter is provided, the multiple parallel-connected converter includes: a first converter having a first input end and a first output end, wherein the first converter includes a first inductor, a first transformer connected in series; and a second converter having a second input end and a second output end, wherein the second converter includes a second inductor, a second transformer connected in series, wherein the second output end is connected with the first output end in parallel and the second input end is connected with the first input end in parallel. Wherein the first transformer and the second transformer are integrated in a first magnetic element, the first magnetic element includes a first side column, a second side column, a first central column and a second central column, the first transformer includes a first primary coil and a first secondary coil positioned on the first central column, and the second transformer includes a second primary coil and a second secondary coil positioned on the second central column, and the first central column and the second central column have a same cross sectional area.

According to another aspect of the present disclosure, a multiple parallel-connected converter is provided, the multiple parallel-connected converter includes: a first converter having a first input end and a first output end, wherein the first converter includes a first inductor, a first transformer connected in series; and a second converter having a second input end and a second output end, wherein the second converter includes a second inductor, a second transformer connected in series, wherein the second output end is connected with the first output end in parallel and the second input end is connected with the first input end in parallel. Wherein the first inductor and the second inductor are integrated in a first magnetic element, the first magnetic element includes a first side column, a second side column, a first central column and a second central column, the first inductor includes a first coil, the second inductor includes a second coil, the first coil is positioned around the first central column to form the first inductor, the second coil is positioned around the second central column to form the second inductor, and the first central column and the second central column have a same cross sectional area.

The additional aspects and advantages of the present disclosure will be partly set forth in the following description, and partly become apparent from the description or learned from practice of the present disclosure.

BRIEF DESCRIPTION OF THE DRAWINGS

The above and other features and advantages of the present disclosure will become more apparent by describing exemplary embodiments thereof with reference to the attached drawings.

DETAILED DESCRIPTION

Figure 1:
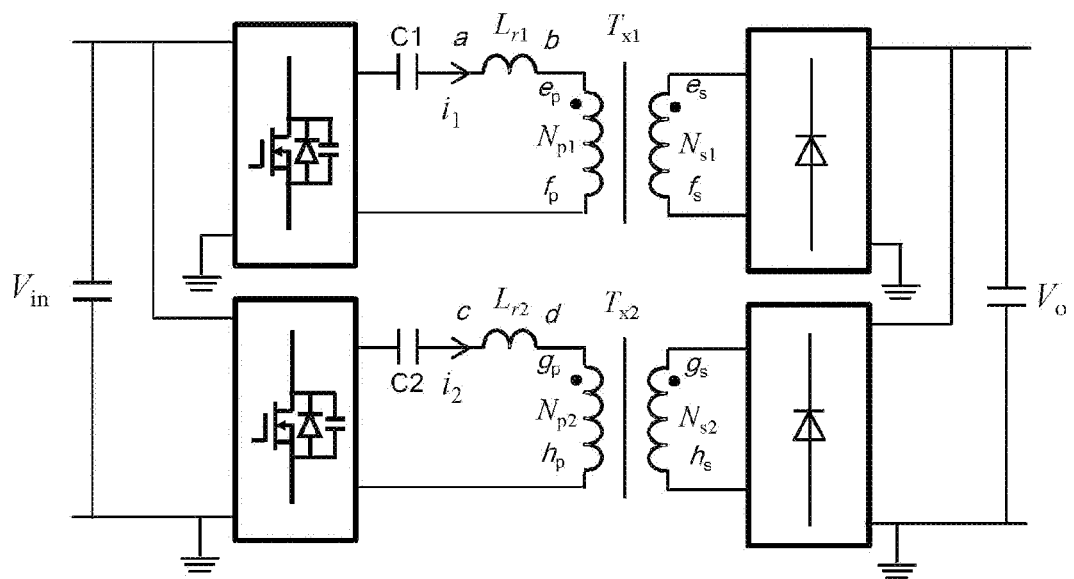
FIG. 1 shows a circuit topologic diagram of a multiple parallel-connected resonant converter according to an embodiment of the present disclosure.

Now, exemplary embodiments of the present disclosure will be more fully described with reference to the attached drawings. However, the exemplary embodiments can be implemented in various ways, and should not be construed as being limited to the embodiments set forth herein, rather, these embodiments are provided so that the present disclosure will be thorough and complete, and will fully convey the scope of the present disclosure to the person skilled in the related art. Throughout the drawings, the same reference numerals are used to refer to the same or similar structure, and thus its detail description will be omitted as necessary.

The terms "a", "an", "the", "said" and "at least one", when describing element/constituent/or the like as described and/or shown herein, are used to express the presence of one or more the element/constitute/or the like. The terms "include", "comprise" and "have", as used herein, are intended to be inclusive, and mean there may be additional elements/constituents/or the like other than the listed elements/constituents/or the like. The relativity words, such as "upper" or "lower", as used herein, are used to describe the relative relationship of the referenced component to another component. It is appreciated that if the referenced device is inversed upside down, the component indicated as being the "upper" side would become the component on the "lower" side. In addition, the words "first", "second", or the like, as used in claims, are meant to indication, but not to limit the object to which they modify.

In an embodiment of the present disclosure, a multiple parallel-connected resonant converter is used to indicate a converter formed by connecting two or more electrical branches in parallel, in which functional components having the same function in various different converters, such as inductors or transformers, are integrated into one magnetic element, thereby the volume and weight of the multiple parallel-connected resonant converter may be reduced. Since the branches have uniform electrical parameters due to the integrated magnetic element, it facilitates to simplify control circuits, optimize current sharing character of the branches, and improve efficiency of a power supply. Hereinafter, specific embodiments of the present disclosure will be described in detail by example of a multiple parallel-connected resonant converter having two branches connected in parallel.

In the present disclosure, the expression "two central columns having same cross sectional area" means the difference therebetween lies within about 10%, and for example, within about 5%. The expression "having same inductance" means the inductance difference is no more than about 10%, and for example, no more than about 5%.

Multiple Parallel-Connected Resonant Converter

With reference to FIG. 1, an embodiment of a multiple parallel-connected resonant converter according to the present disclosure includes a first converter and a second converter.

The first converter has a first input end and a first output end. The first converter includes a first inductor $L_{r1}$, a first transformer $T_{x1}$ and a first capacitor $C_1$, and the first inductor $L_{r1}$, the first transformer $T_{x1}$ and the first capacitor $C_1$ are connected in series to form a first resonant unit, a primary winding $N_{p1}$ of the first transformer has a terminal $e_p$ and a terminal $f_p$, and a secondary winding $N_{s1}$ thereof has a terminal $e_s$ and a terminal $f_s$.

The second converter has a second input end and a second output end. The second converter includes a second inductor $L_{r2}$, a second transformer $T_{x2}$ and a second capacitor $C_2$, the second inductor $L_{r2}$, the second transformer $T_{x2}$ and the second capacitor $C_2$ are connected in series to form a second resonant unit, a primary winding $N_{p2}$ of the second transformer has a terminal $g_p$ and a terminal $h_p$, and a secondary winding $N_{s2}$ thereof has a terminal $g_s$ and a terminal $h_s$.

The second output end of the second converter and the first output end of the first converter may be connected in parallel to output voltage $V_o$; and the second input end of the second converter and the first input end of the first converter may be connected in parallel to receive input voltage $V_{in}$. Of course, the second input end and the first input end may also be connected in other ways, such as in series, to receive the input voltage $V_{in}$.

In an embodiment of the multiple parallel-connected resonant converter according to the present disclosure, the first inductor $L_{r1}$ and the second inductor $L_{r2}$ are integrated in a first magnetic element, to form an inductor-integrated magnetic element; or the first transformer $T_{x1}$ and the second transformer $T_{x2}$ are integrated into a second magnetic element to form a transformer-integrated magnetic element; or the first inductor $L_{r1}$ and the second inductor $L_{r2}$ are integrated into a first magnetic element to form an inductor-integrated magnetic element, and at the same time, the first transformer $T_{x1}$ and the second transformer $T_{x2}$ are integrated into a second magnetic element, to form a transformer-integrated magnetic element.

Hereinafter, the inductor-integrated magnetic element in an embodiment of the multiple parallel-connected resonant converter according to the present disclosure will be described.

Figure 2A:
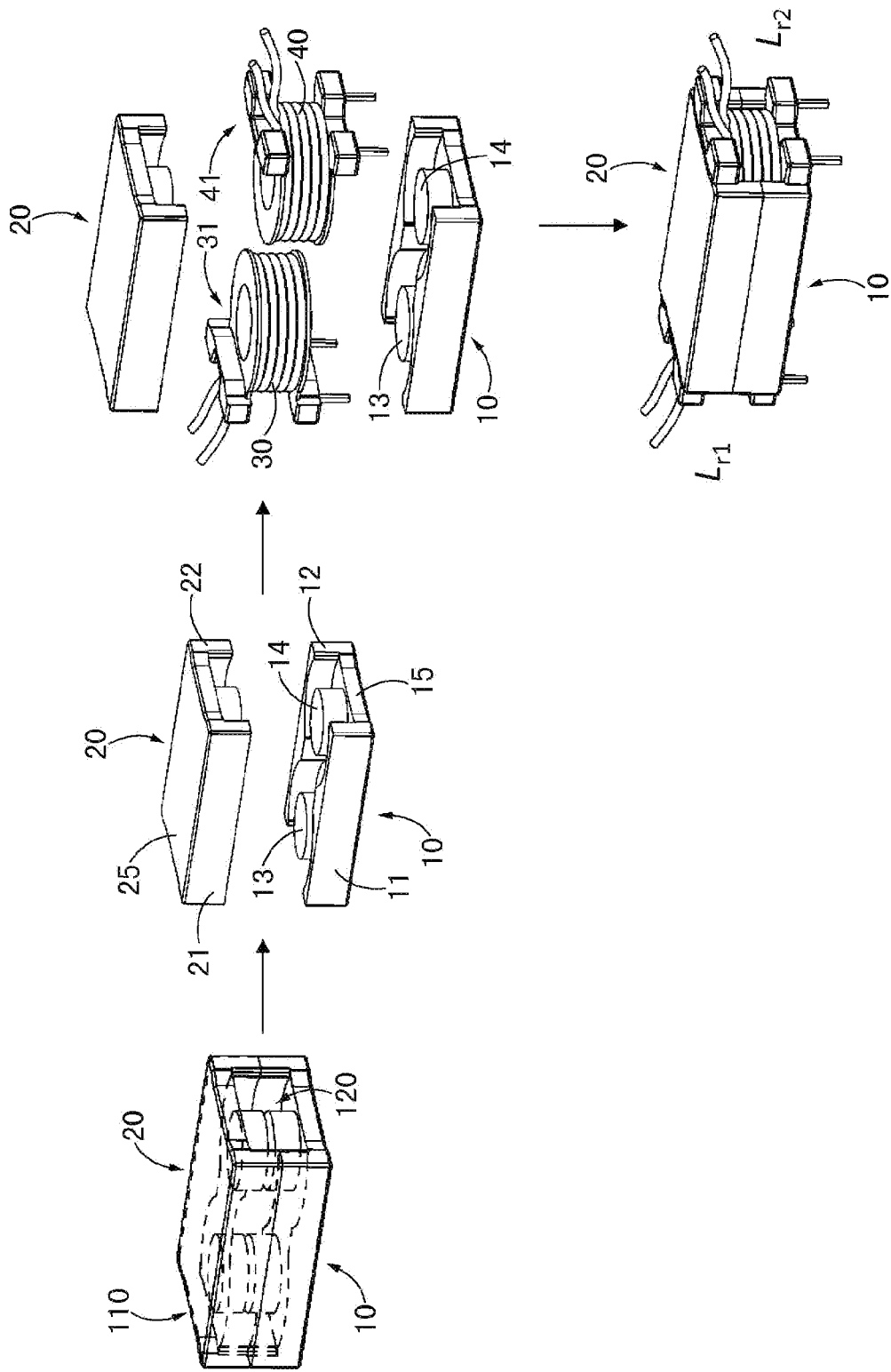
FIG. 2A is an exploded perspective diagram showing assembly process of an inductor-integrated magnetic element in a multiple parallel-connected resonant converter according to an embodiment of the present disclosure.
Figure 2B:
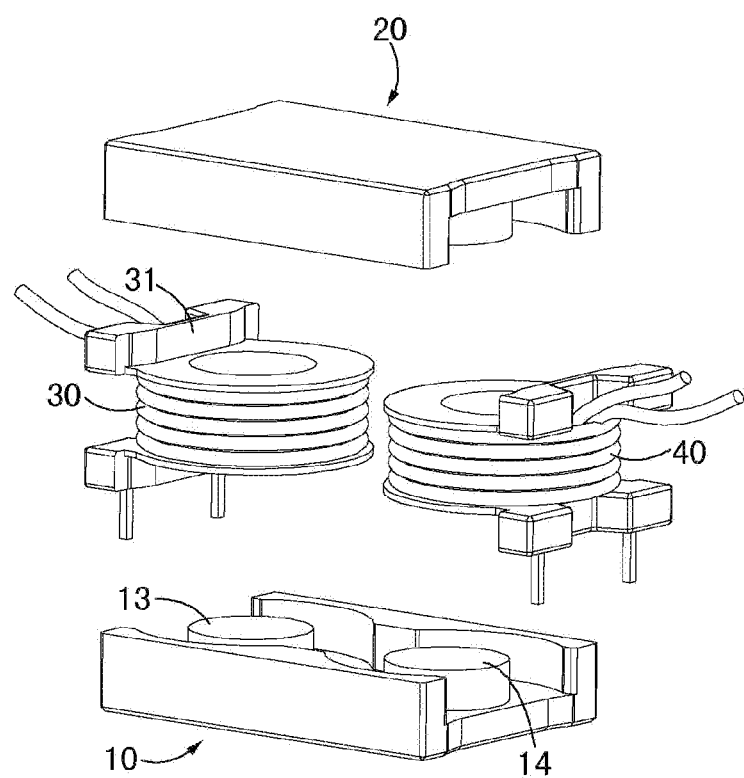
FIG. 2B shows an exploded schematic structure diagram of the inductor-integrated magnetic element as shown in FIG. 2A.

With reference to FIG. 2A and FIG. 2B, FIG. 2A is an exploded perspective diagram showing assembly process of a first inductor-integrated magnetic element in the multiple parallel-connected resonant converter according to an embodiment of the present disclosure, and FIG. 2B is an exploded schematic structure diagram showing the inductor-integrated magnetic element as shown in FIG. 2A.

The inductor-integrated magnetic element includes a first core, a first coil 30 and a second coil 40. The first core may include a first lower core 10 and a first upper core 20 having the same structure and arranged oppositely, but the present disclosure will not be limited thereby. The lower core 10 includes a first lower core cover 15, and a first lower side column 11, a second lower side column 12, a first lower central column 13 and a second lower central column 14 connected with the first lower core cover 15. The first lower central column 13 and the second lower central column 14 may be located between the first lower side column 11 and the second lower side column 12, but the present disclosure will not be limited thereby.

Figure 2C:
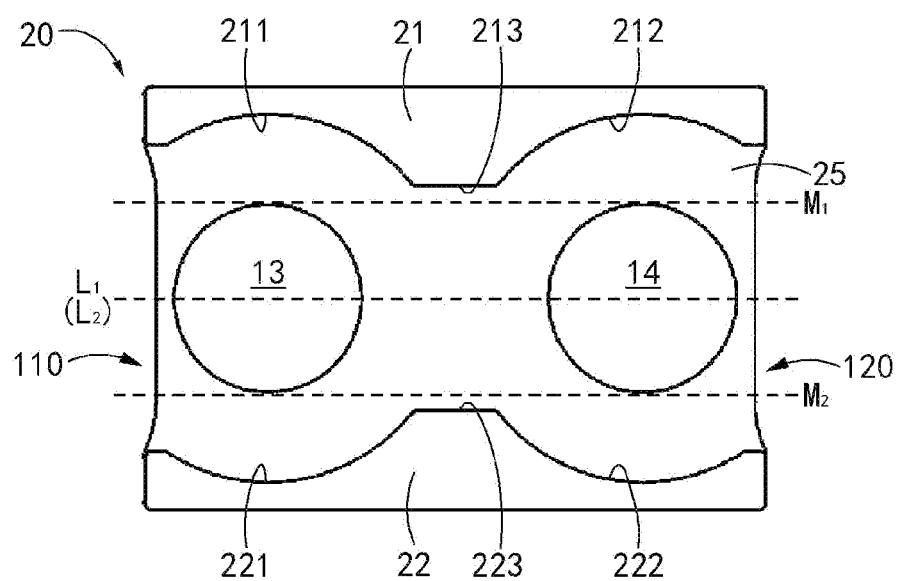
FIG. 2C is a schematic diagram showing positional relationship between two central columns and two openings in the inductor-integrated magnetic element as shown in FIG. 2A.

The first upper core 20 includes a first upper core cover 25, and a first upper side column 21, a second upper side column 22, a first upper central column and a second upper central column connected with the first upper core cover 25, as shown in FIG. 2C. The first upper central column and the second upper central column may be located between the first upper side column and the second upper side column, but the present disclosure will not be limited thereby.

The first lower side column 11, the second lower side column 12, the first lower central column 13 and the second lower central column 14 are abutted with or adjacent with the first upper side column 21, the second upper side column 22, the first upper central column and the second upper central column in one by one correspondence, but the present disclosure will not be limited thereby. The first lower side column 11 may form a first side column together with the first upper side column 21; the second lower side column 12 may form a second side column together with the second upper side column 22; the first lower central column 13 may form a first central column together with the first upper central column, wherein there may be an gap positioned between the first lower central column 13 and the first upper central column; the second lower central column 14 may form a second central column together with the second upper central column, and there may be a gap positioned between the second lower central column 14 and the second upper central column, but the present disclosure will not be limited thereby, for example, the gaps may not be provided.

In the multiple parallel-connected resonant converter according to an embodiment of the present disclosure, the first lower central column 13, the first upper central column facing the first lower central column 13, the second lower central column 14 and the second upper central column facing the second lower central column 14 may have the same cross sectional area; the two central columns may be aligned and arranged symmetrically. When the gaps are needed to be ground on the two central columns, they may be ground in the same direction at the same time, by which it may be guaranteed that the gaps may be consistently ground on the two central columns, by which difference between inductance of the two inductors may be effectively reduced, and the inductance difference may be reduced to 3% (inclusive) or less, compared with 10% of the difference in the conventional split inductors. It will be helpful to keep the resonant parameters of the multiple parallel-connected resonant converter according to an embodiment of the present disclosure in uniform characteristics, facilitate current sharing between the two circuits, improve the efficiency of a power supply, and be helpful to simplify a control circuit at the same time.

It should be appreciated that the description on the first core is only illustrative, and will not construct limitation on the present disclosure, and a magnetic element with other structure may also be equally applied into the present disclosure. The first inductor $L_{r1}$ includes a first coil 30, the first coil 30 is positioned on the first central column to form the first inductor $L_{r1}$. Wherein the first coil 30 may be formed by winding enameled wire along a direction, the first coil 30 may be directly positioned on the first central column, or may be wound on a first bobbin 31, and then the first bobbin 31 is positioned over the first central column, the present disclosure will not be limited thereby. The first coil is not limited to the enameled wire, and may be in other material structure or type, such as copper foils, or the like.

The second inductor $L_{r2}$ includes a second coil 40, the second coil 40 is positioned on the second central column to form the second inductor $L_{r2}$. Wherein the second coil 40 may be formed by winding enameled wire along a direction, the second coil 40 may be directly wound on the second central column, or may be wound on a second bobbin 41 and then the second bobbin 41 is positioned over the second central column, but the present disclosure is not limited thereby. The second coil 40 is not limited to the enameled wire, and may also be in other material structure or type, such as copper foils, or the like.

In the multiple parallel-connected resonant converter according to the present embodiment, the first inductor $L_{r1}$ and the second inductor $L_{r2}$ are integrated on the first core, and the two inductors share the side columns and the core cover of the first core, by which it is possible to effectively reduce the overall volume and weight of the magnetic element integrated with the first inductor $L_{r1}$ and the second inductor $L_{r2}$. The first central column and the second central column may have the same cross sectional area, to achieve the same inductance between the first inductor $L_{r1}$ and the second inductor $L_{r2}$.

Figure 2D:
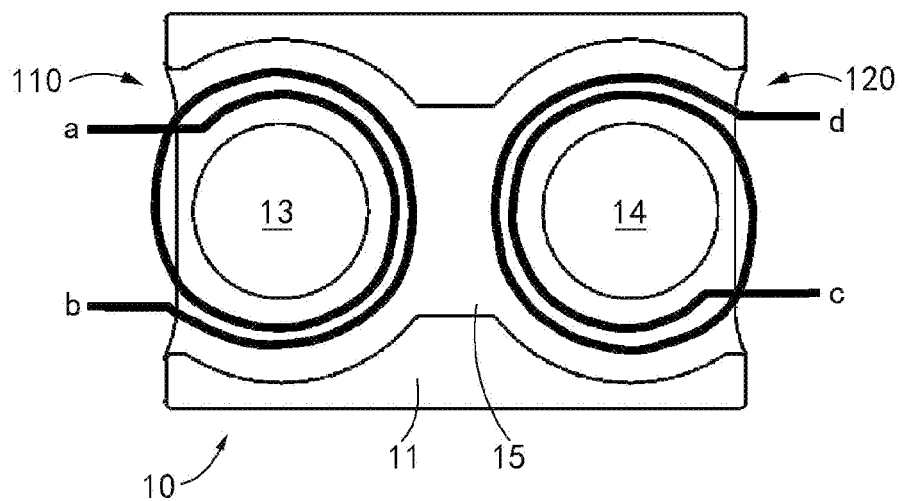
FIG. 2D is a schematic diagram showing winding directions of two coils in the inductor-integrated magnetic element as shown in FIG. 2A.

With reference to FIG. 2C and FIG. 2D, FIG. 2C is a schematic diagram showing a first positional relationship between the two central columns and two openings in the inductor-integrated magnetic element as shown in FIG. 2A, FIG. 2D is a schematic diagram showing winding directions in which the two coils are wound in the inductor-integrated magnetic element as shown in FIG. 2A. As shown in FIG. 2C, the first side column (refer to the first upper side column 21) and the second side column (refer to the second upper side column 22) form a first opening 110 and a second opening 120. A first connection line $L_1$ may be drawn by connecting a center of the first opening 110 with a center of the second opening 120, a second connection line $L_2$ may be drawn by connecting centers of the first central column (refer to the first lower central column 13) and the second central column (refer to the second lower central column 14), but the present disclosure will not be limited thereby, for example, the first connection line $L_1$ and the second connection line $L_2$ may also be formed by connecting two points other than the centers. A side of the first side column (refer to the first upper side column 21) towards the first central column and the second central column is provided with a first arc side 211 and a second arc side 212, and a first platform 213 may be provided at intersection position between the first arc side 211 and the second arc side 212. A side of the second side column (refer to the second upper side column 22) towards the first central column and the second central column is provided with a third arc side 221 and a fourth arc side 222, and a second platform 223 is provided at intersection position between the third arc side 221 and the fourth arc side 222. The first central column (refer to the first lower central column 13) and the second central column (refer to the second lower central column 14) may be in circular or oval shape, and a first external common tangent line $M_1$ and a second external common tangent line $M_2$ are drawn according to the first central column and the second central column. In this embodiment as shown in FIG. 2C, there is no intersection point between the first arc side 211, the second arc side 212, the third arc side 221, the fourth arc side 222, the first external common tangent line $M_1$ and the second external common tangent line $M_2$. In the embodiment as shown in FIG. 2C, the first connection line $L_1$ is parallel with (including coincide with) the second connection line $L_2$, but the present disclosure is not limited thereby, and the first connection line $L_1$ and the second connection line $L_2$ are not limited to be parallel with each other, and it is applicable that the two lines are perpendicular to each other or intersected with each other, that is, in other embodiments, the first connection line $L_1$ and the second connection line $L_2$ may be parallel with each other, perpendicular to each other or form a certain angle.

Figure 4:
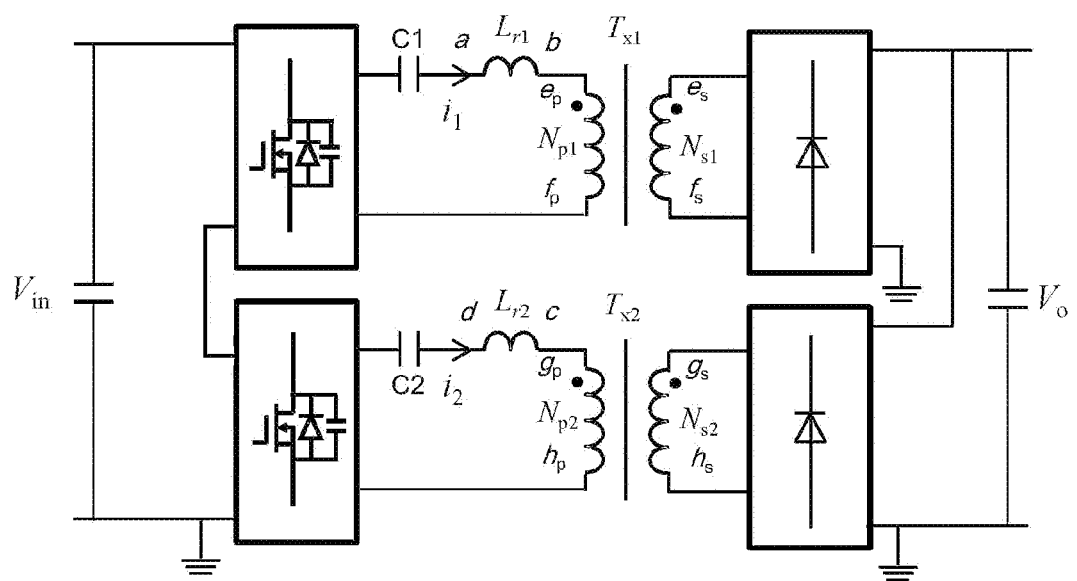
FIG. 4 shows a circuit topologic diagram of a multiple parallel-connected resonant converter according to another embodiment of the present disclosure.

In connection with FIG. 1, FIG. 2D and FIG. 4, the winding directions of the two coils in the inductor-integrated magnetic element are the same or opposite. When the input ends of the converters are connected in series, the magnetic fields formed by coils of the converters are the same or different by an angle of about 180 degrees. One of the coils has a first leading out terminal a and a second leading out terminal b, and its winding direction may be defined as starting from the first leading out terminal a and ending at the second leading out terminal b. The other coil has a first leading out terminal c and a second leading out terminal d, and its winding direction may be defined as starting from the first leading out terminal c and ending at the second leading out terminal d. The four leading out terminals of the two coils may be located with respect to the openings in various combinations, for example, any two of the leading out terminals may be located at one opening, and the remaining two leading out terminals may be located at another opening; alternatively, the four leading out terminals are all located at the same one opening. By setting current in the two coils, magnetic fields formed by the two coils may be in opposite directions at the same time, but the present disclosure is not limited thereby, and also may be in the same directions.

In an embodiment of the multiple parallel-connected resonant converter of the present disclosure, when the input ends of the converters are connected in parallel, the first inductor and the second inductor are operated at the same time, and in operation time sequence, they are different from each other by an angle, e.g. about 90 degrees when the number of the branches are 2, that is 90 degrees equals 180/2, to reduce the magnetic density and reduce the ripples of the currents. When the number of the branches are N, the magnetic fields formed by the N coils are different by an angle of 180/N. For magnetic flux distribution in the first magnetic element, the two central columns are operated independently, and there is no coupling influence therebetween. In an embodiment, the two side columns and the two core covers of the first magnetic element are commonly used by the two inductors, and since the two inductor are operated with the time sequence thereof being staggered about 90 degrees, thus, the magnetic flux of the two side columns and the magnetic flux of the two core cover are partly offset. Thus, the size and the weight of the side columns and the core covers may be reduced with loss of the first magnetic element being kept unchanged, or the loss of the first magnetic element may be reduced with the volume being constant. But the present disclosure is not limited thereby, for example, the operation time sequences of the first inductor and the second inductor may be staggered by about 180 degrees, or the like, or the operation time sequence of the first inductor and the second inductor may be the same, and so on.

Hereinafter, a transformer-integrated magnetic element in an embodiment of a multiple parallel-connected resonant converter according to the present disclosure will be described.

Figure 3A:
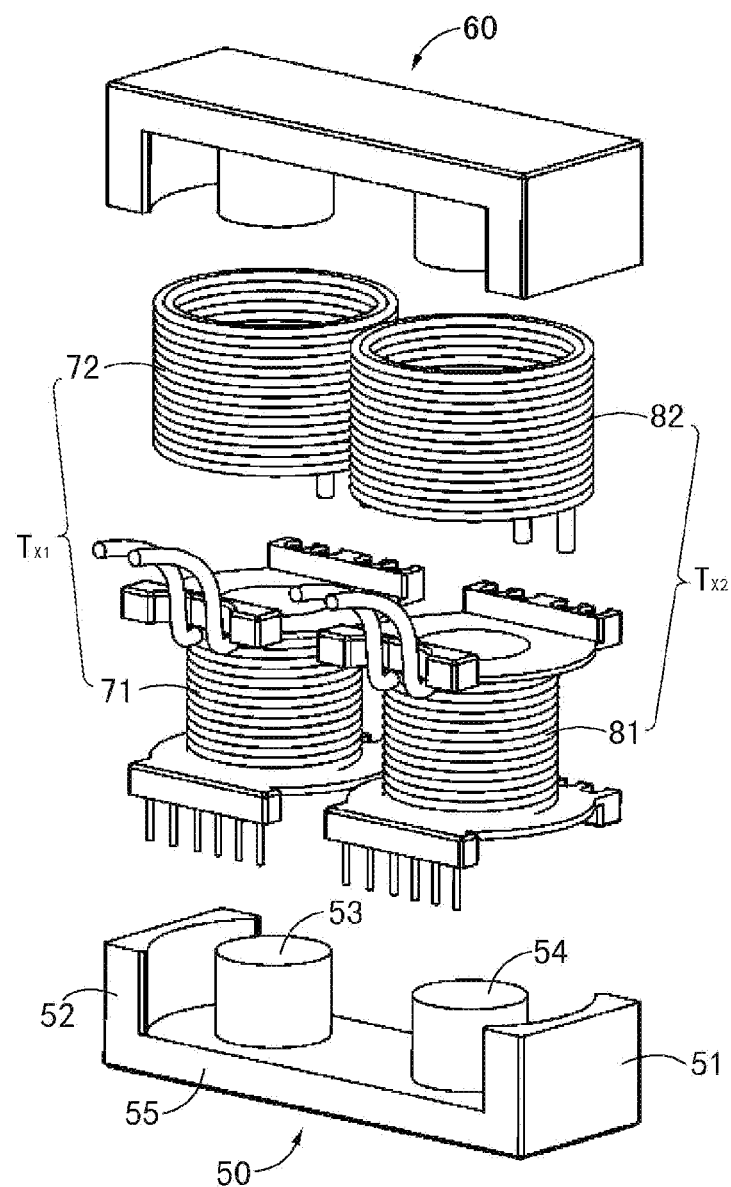
FIG. 3A is an exploded perspective diagram showing a transformer-integrated magnetic element in a multiple parallel-connected resonant converter according to an embodiment of the present disclosure.
Figure 3B:
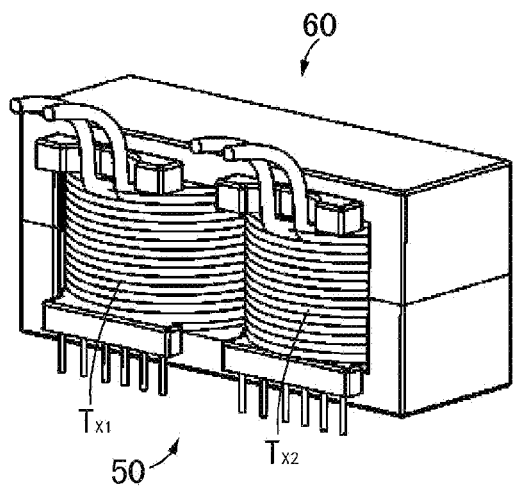
FIG. 3B is an assembled diagram showing the transformer-integrated magnetic element as shown in FIG. 3A.

With reference to FIG. 3A and FIG. 3B, FIG. 3A is an exploded perspective diagram showing a transformer-integrated magnetic element in a multiple parallel-connected resonant converter according to an embodiment of the present disclosure, and FIG. 3B shows its assembled diagram. The transformer-integrated magnetic element includes a second magnetic element integrated with a first transformer $T_{x1}$ and a second transformer $T_{x2}$. The second magnetic element may include a second lower core 50 and a second upper core 60 which have the same structure and are arranged oppositely. The second lower core 50 includes a second lower core cover 55, and a third lower side column 51, a fourth lower side column 52, a third lower central column 53 and a fourth lower central column 54 connected with the second lower core cover 55. The two side columns may have arc sides.

The first transformer $T_{x1}$ may include one or more first primary coil 71 and one or more first secondary coil 72, the first primary coil 71 and the first secondary coil 72 are positioned around the third central column, to form the first transformer $T_{x1}$. The second transformer $T_{x2}$ may include one or more second primary coil 81 and one or more second secondary coil 82, the second primary coil 81 and the second secondary coil 82 are positioned around the fourth central column to form the second transformer $T_{x2}$. The first primary coil 71 and the first secondary coil 72, as well as the second primary coil 81 and the second secondary coil 82 may be formed by winding enameled wires or triple insulated wires, but the present disclosure will not be limited thereby. The first primary coil 71 and the first secondary coil 72 may be wound on a bobbin, and the second primary coil 81 and the second secondary coil 82 may be wound on another bobbin, then the two bobbins are respectively mounted on the third central column and the fourth central column to form the transformer-integrated magnetic element. By setting current in the two primary coils, magnetic fields generated by the respective primary coils may be made to be in opposite direction, but the present disclosure will not be limited thereby, and the magnetic fields may also be in the same direction.

In an embodiment, the core in the transformer-integrated magnetic element may also employ the core in the above described inductor-integrated magnetic element, but the present disclosure is not limited thereby.

In the present embodiment, the first transformer $T_{x1}$ has four leading out terminals, that is, two leading out terminals for the first primary coil 71 and two leading out terminals for the first secondary coil 72, these four leading out terminals are all located at the third opening or the fourth opening, or may also be respectively located at the third opening and the fourth opening. The second transformer $T_{x2}$ has four leading out terminals, and these four leading out terminals are all located at the third opening or the fourth opening, or may also be respectively located at the third opening and the fourth opening.

In the embodiment of the multiple parallel-connected resonant converter according to the present disclosure, when the input ends of the converters are connected in parallel, its electrical operation character is that the two primary windings are operated with the time sequence thereof being different from each other by an angle, e.g. about 90 degrees when the number of the branches are 2, that is 90 degrees equals 180/2, so as to form a staggered parallel transformer and thus reduce the magnetic flux density and further reduce the ripples of the currents when the transformer is used in the said converter. When the number of the branches are N, the magnetic fields formed by the N primary windings are different by an angle of 180/N. In an embodiment, for magnetic flux distribution in the second magnetic element, the two central columns are decoupled from each other, and are operated independently, but the present disclosure is not limited thereby. The two side columns and the two core covers of the second magnetic element may be commonly used by the two transformers, and since the two primary windings are operated with the time sequence thereof being staggered by about 90 degrees, the magnetic flux from the two side columns and the core cover will partly offset, thus, the size and the weight of the side columns and the core covers may be reduced with the loss of the second magnetic element being kept unchanged, or the loss of the second magnetic element may be reduced with the volume thereof being kept unchanged. But the present disclosure will not be limited thereby, for example, the operation time sequence of the two primary windings may be staggered by about 180 degrees, or the like, or the two primary windings may also be operation at the same time sequence, etc.

It is appreciated that the present disclosure is not limited to the resonant converter with two parallel transformers, and more than two transformers, such as three, five, or the like may also be applied.

The multiple parallel-connected resonant converter, as described herein, may only employ the inductor-integrated magnetic element, or only employ the transformer-integrated magnetic element, or employ both the inductor-integrated magnetic element and the transformer-integrated magnetic element at the same time, the present disclosure would not be limited thereby. As described herein, the core in the inductor-integrated magnetic element may also be used in the transformer-integrated magnetic element, and the core in the transformer-integrated magnetic element may also be used in the inductor-integrated magnetic element, the present disclosure is not limited thereby.

In the multiple parallel-connected resonant converter according to the present disclosure, the first inductor of the first converter and the second inductor of the second converter are integrated in the first magnetic element, so that the same one magnetic element may be commonly used by two or more inductors, thus volume and weight of the multiple parallel-connected resonant converter may be effectively decreased. Likewise, in the multiple parallel-connected resonant converter, the first transformer of the first converter and the second transformer of the second converter are integrated in the second magnetic element, so that the same one magnetic element may be commonly used by two or more transformers, thus volume and weight of the multiple parallel-connected resonant converter may be decreased. By decreasing the volume of the multiple parallel-connected resonant converter and reducing the weight, it is facilitated to improve the power density of the power supply.

However, the present disclosure is not limited to resonant converter. For example, in a parallel-connected converter, a first converter having a first input end and a first output end may include a first inductor and a first transformer connected in series, and a second converter having a second input end and a second output end may include a second inductor, a second transformer connected in series. The second output end is connected with the first output end in parallel and the second input end is connected with the first input end in parallel. The first transformer and the second transformer are integrated in a first magnetic element. The first magnetic element includes a first side column, a second side column, a first central column and a second central column. The first transformer includes a first primary coil and a first secondary coil positioned on the first central column, and the second transformer includes a second primary coil and a second secondary coil positioned on the second central column. The first central column and the second central column have a same cross sectional area. Magnetic fields generated by the first primary coil and the second primary coil may be different by an angle of about 90 degrees in time sequence.

In another example, in a parallel-connected converter, a first converter having a first input end and a first output end may include a first inductor and a first transformer connected in series, and a second converter having a second input end and a second output end may include a second inductor, a second transformer connected in series. The second output end is connected with the first output end in parallel and the second input end is connected with the first input end in parallel. The first inductor and the second inductor are integrated in a first magnetic element. The first magnetic element comprises a first side column, a second side column, a first central column and a second central column. The first inductor includes a first coil, and the second inductor includes a second coil. The first coil is positioned around the first central column to form the first inductor, and the second coil is positioned around the second central column to form the second inductor, and the first central column and the second central column have a same cross sectional area. Magnetic fields formed by the first coil and the second coil may be different by an angle of about 90 degrees in time sequence.

The Inductor-Integrated Magnetic Element

With reference to FIG. 2A to FIG. 2D, the inductor-integrated magnetic element in the embodiment of the present disclosure substantially has the same structure as the inductor-integrated magnetic element used in the multiple parallel-connected resonant converter according the embodiment of the present disclosure, and thus will not be further described herein. The core shown in FIG. 3A to FIG. 3B may also be used in the inductor-integrated magnetic element.

It is noted that the inductor-integrated magnetic element not only may be used in a multiple parallel-connected resonant converter, but also may be used in other power supply circuit, for example, used in dual or multiple Buck circuit (chopper buck circuit), Boost circuit (voltage-increasing circuit), or a Boost PFC circuit (boost power factor correction circuit), or the like.

Figure 5A:
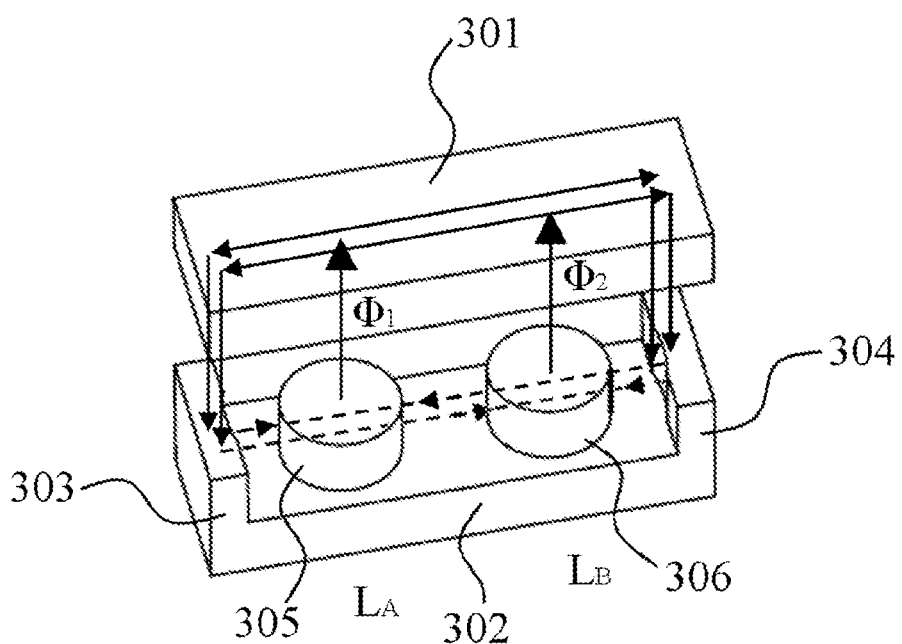
FIG. 5A is a three-dimensional view of a magnetic core in an exemplary embodiment of an integrated inductor of the present disclosure.
Figure 5B:
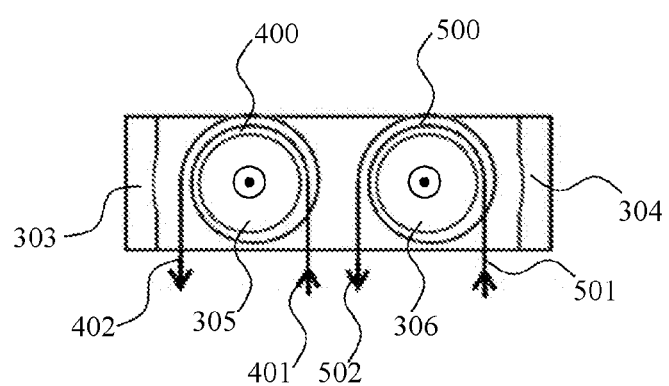
FIG. 5B is a top view of the integrated inductor shown in FIG. 5A.
Figure 5C:
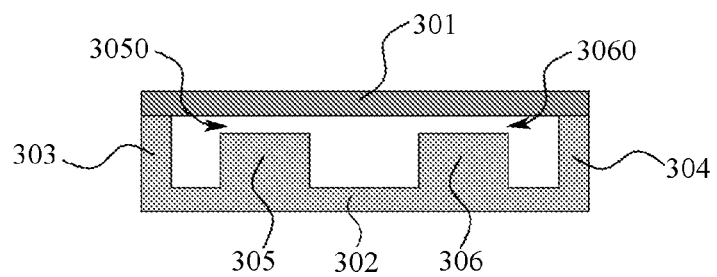
FIG. 5C is a longitudinal cross-sectional view of FIG. 5A.

As shown in FIG. 5A, FIG. 5B, and FIG. 5C, an embodiment of the integrated inductor of the present disclosure comprises a magnetic core and two windings, i.e., a first winding 400 and a second winding 500. The magnetic core comprises an upper cover plate 301, a bottom cover plate 302, two side columns, i.e., a first side column 303 and a second side column 304, and two central columns, i.e., a first central column 305 and a second central column 306.

The upper cover plate 301 and the bottom cover plate 302 are provided opposite to each other. The first side column 303 and the second side column 304 are provided between the upper cover plate 301 and the bottom cover plate 302. The first central column 305 and the second central column 306 are positioned between the upper cover plate 301 and the bottom cover plate 302 and are positioned between the first side column 303 and the second side column 304. The first side column 303, the second side column 304, the first central column 305, and the second central column 306 are provided along a straight line such as a central line X of the bottom cover plate of the integrated inductor. In other words, the central column should be set within a certain deviation along the center line, allowing a deviation of 15 mm or less, but it should be roughly kept in a straight line, and the rest embodiments are the same. The cross-sectional area of first side column 303 is equal to the cross-sectional area of the second side column 304, and the cross-sectional area of first central column 305 is equal to the cross-sectional area of second central column 306. The setting of the cross-sectional area is not absolute and allows for an area deviation of +/−15%. In this embodiment, the sum of the areas of the first side column 303 and the second side column 304 is equal to half of the sum of the cross-sectional areas of the first central column 305 and the second central column 306. In some other embodiments, the sum of the areas of the first side column 303 and the second side column 304 may also be greater than ½ of the sum of the cross-sectional areas of the first central column 305 and the second central column 306.

As shown in FIG. 5C, a first air gap 3050 is provided between the first central column 305 and the upper cover plate, a second air gap 3060 is provided between the second central column 306 and the upper cover plate. In this embodiment, the length of the first air gap 3050 and the length of the second air gap 3060 are the same, the range of the length of the air gap is between 0.1 mm-10 mm. In some other embodiments, the air gap/gaps of the first central column 305 and the air gap/gaps of second central column 306 may also be unequal. There are no artificially opened air gaps on the first side column 303 and the second side column 304, except of the gaps 6-15 μm due to factors such as the assembly of the side columns. The gaps caused by the assembly of side columns are not refer to the air gap mentioned in present disclosure.

As shown in FIG. 5B, two windings are positioned on the two central columns respectively, thus forming two inductors. In detail, the first winding 400 is wound on the first central column 305 to form the first inductor $L_A$ and the second winding 500 is wound on the second central column 306 to form the second inductor $L_B$. The first winding 400 and the second winding 500 are electrically coupled in parallel.

The first winding 400 contains a first terminal 401 and a second terminal 402, and the second winding 500 contains a first terminal 501 and a second terminal 502. when the same reference current flows through the first winding 400 and the second winding 500 respectively, the reference current flows from the first terminal 401 of the first winding 400 and out of the second terminal 402, forming a first reference magnetic field on the first central column 305; the identical reference current flows from the first terminal 501 of the second winding 500 and out of the second terminal 502, forming a second reference magnetic field on the second central column 306, the first reference magnetic field having the same reference direction as the second reference magnetic field.

In the integrated inductor of this embodiment, the first inductor $L_A$ and the second inductor $L_B$ are weakly coupled to each other, for example the coupling coefficient between inductors is less than or equal to 0.1. The weak coupling between the two inductors can be achieved by providing air gap/gaps on the central columns and without air gap on the side columns, the upper cover plate and the bottom cover plate.

In this embodiment, the first winding 400 of the first inductor $L_A$ and the second winding 500 of the second inductor $L_B$ have equal turns, and the inductance of the first inductor $L_A$ and the second inductor $L_B$ is equal and allows for a deviation of +/−15%. In some other embodiments, for example, when the air gap/gaps between the first central column and the both cover plate is not equal to the air gap/gaps between the second central column and the both cover plate, the inductance of the first inductor $L_A$ and the second inductor $L_B$ can be made equal by adjusting the turns of the two windings.

The operating current flowing through the first winding 400 and the second winding 500 in the integrated inductor of this embodiment includes a direct current (DC) component or a low-frequency current component (i.e. 50 Hz or 60 Hz), and a high-frequency current component (for example, 65 kHz), where the two DC components or the two low-frequency current components are equal in amplitude and a deviation within +/−15% is allowed. The high-frequency current components flowing through the first winding 400 and the second winding 500 are 180 degrees out of phase, the phase difference allows a deviation of +/−5 degrees.

Figure 5D:
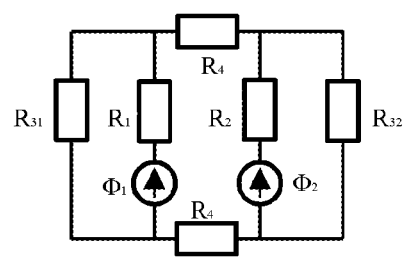
FIG. 5D is an equivalent magnetic circuit diagram of the integrated inductor shown in FIG. 5A.

Referring to FIG. 5D, FIG. 5D is an equivalent magnetic circuit diagram of the integrated inductor shown in FIG. 5A. $R_{31}$ is the reluctance between the first side column 303 and the first central column 305, $R_{32}$ is the reluctance between the second central column 306 and the second side column 304, $R_1$ is the reluctance of the first central column 305, $R_2$ is the reluctance of the second central column 306, and $R_4$ is the reluctance between the first central column 305 and the second central column 306. The operating current through the first inductor $L_A$ generates the magnetic flux density $B_1$ through the cross-section of the first central column and the magnetic flux is $\Phi_1$, the operating current through the second inductor $L_B$ generates the magnetic flux density $B_2$ on the cross-section of the second central column and the magnetic flux is $\Phi_2$; the magnetic flux density on the first side column 303 is $B_{31}$, the magnetic flux density on the second side column 304 is $B_{32}$, and the magnetic flux density between the first central column 305 and the second central column 306 is $B_4$.

Referring to FIG. 5A and FIG. 5D, since there are air gaps above the first central column 305 and the second central column 306, the reluctance $R_1$ and reluctance $R_2$ are much larger than the reluctance $R_{31}$, reluctance $R_{32}$, and reluctance $R_4$, so the magnetic flux $\Phi_1$ and magnetic flux $\Phi_2$ has tiny effect on each other, but only the magnetic fluxes spread in the reluctance network of reluctance $R_{31}$, reluctance $R_{32}$, and reluctance $R_4$, thus the enhancement or weakening of flux is resulted.

The first magnetic flux $\Phi_1$ generated by the operating current on the first inductor $L_A$ flows to the left through the reluctance $R_{31}$ and to the right through the reluctance $R_4$ and the reluctance $R_{32}$; the second magnetic flux $\Phi_2$ generated by the operating current on the second inductor $L_B$ flows through the reluctance $R_{32}$, the reluctance $R_4$ and the reluctance $R_{31}$.

Figure 5E:
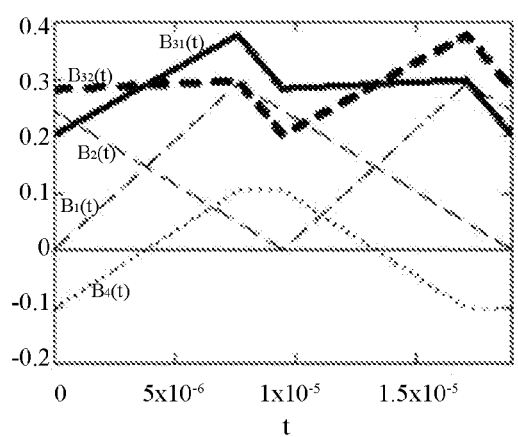
FIG. 5E is a graph of the magnetic flux density distribution in time sequence of the integrated inductor shown in FIG. 5A.

According to the superposition theorem, the vectors of the first magnetic flux $\Phi_1$ and the second magnetic flux $\Phi_2$ flowing across the first side column 303 after each resistive shunt are superimposed; the fluxes of the first magnetic flux $\Phi_1$ and the second magnetic flux $\Phi_2$ flowing across the second side column 304 after each resistive shunt are also superimposed. FIG. 5E shows the flux density time sequence diagram of the integrated inductor shown in FIG. 5B. The fluxes generated by the high-frequency current components of the first magnetic flux $\Phi_1$ and the second magnetic flux $\Phi_2$ at the first side column 303 and side column 304 cancel each other to make each magnetic flux ripple smaller. The flux density of the magnetic field (B=$\Phi$/S) generated by the sum of the direct current component or low-frequency current component and the high-frequency current component varies over time as shown in FIG. 5E. Thus, the integrated inductor of this embodiment has a smaller ripple of flux density on the side columns, as shown in curves $B_{31}(t)$, and $B_{32}(t)$ in FIG. 5E, which reduces the core loss on the side columns, as compared to FIG. 6C.

Considering the core loss as well as the producing process and product application, it is optimal to adopt the magnetic core that the sum of the cross-sectional area of its two side columns is half of the sum of cross-sectional area of two central columns. In some other embodiments it is possible to set the sum of the cross-sectional areas of the two side columns to be greater than ½ of the sum of the cross-sectional areas of the two central columns.

Figure 6A:
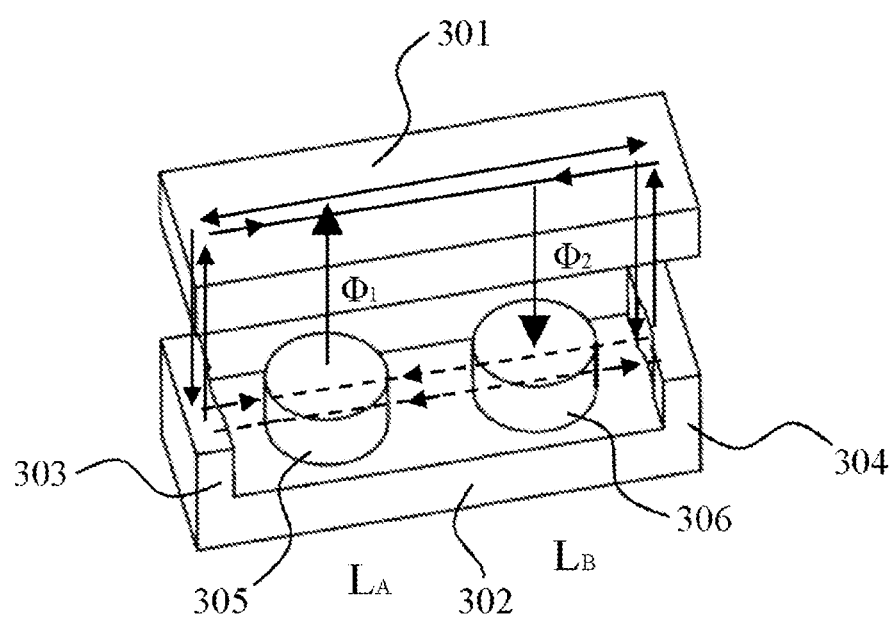
FIG. 6A is a three-dimensional view of the magnetic core of an integrated inductor in the related art.
Figure 6B:
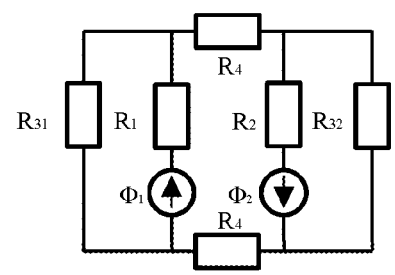
FIG. 6B is a diagram of the equivalent magnetic circuit of the integrated inductor shown in FIG. 6A.

As shown in FIG. 6A and FIG. 6B, a normally used integrated inductor has the same mechanical structure as the integrated inductor shown in FIG. 5A of the present disclosure, which differs from the integrated inductor of the present disclosure in that when the same reference current flows through the first winding 400 and the second winding 500 respectively, the reference current flows from the first terminal 401 of the first winding 400 and out of the second terminal 402, forming a first magnetic field on the first central column 305, and the identical reference current flows from the first terminal 501 of the second winding 500 and out of the second terminal 502, forming a second magnetic field on the second central column 306. The first magnetic field has the opposite reference direction as the second magnetic field.

Figure 6C:
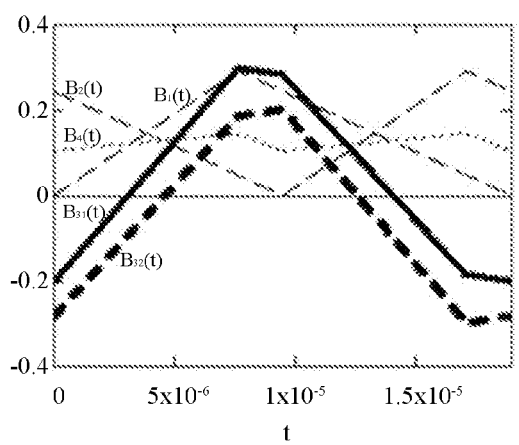
FIG. 6C is a diagram of the flux density distribution in time sequence of the integrated inductor shown in FIG. 6A.

As shown in FIG. 6C, due to the opposite direction of the reference magnetic fields, when the phase difference of the high-frequency current components of operating currents is 180 degrees, it is known that the magnetic flux $\Phi_1$ and the magnetic flux of $\Phi_2$ flowing through the two side columns cannot cancel each other according to the equivalent magnetic circuit diagram shown in FIG. 6B, thus generating a large magnetic flux density and core loss, which can be compared with FIG. 5E.

Comparing the core loss of the integrated inductor shown in FIG. 5A of the present disclosure with that of the integrated inductor shown in FIG. 6A at the side columns under the same conditions, it is found that the core loss of the integrated inductor of the present disclosure at the side columns is about ⅕-⅙ of that of the integrated inductor shown in FIG. 6A.

Figure 7A:
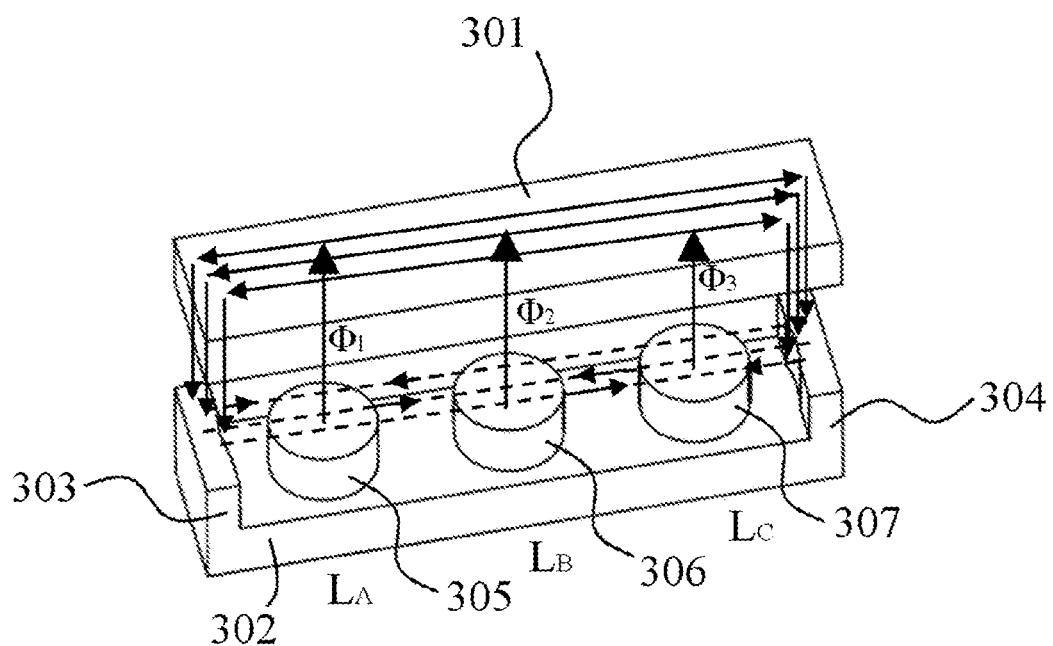
FIG. 7A is a three-dimensional view of a magnetic core in another embodiment of an integrated inductor of the present disclosure.
Figure 7B:
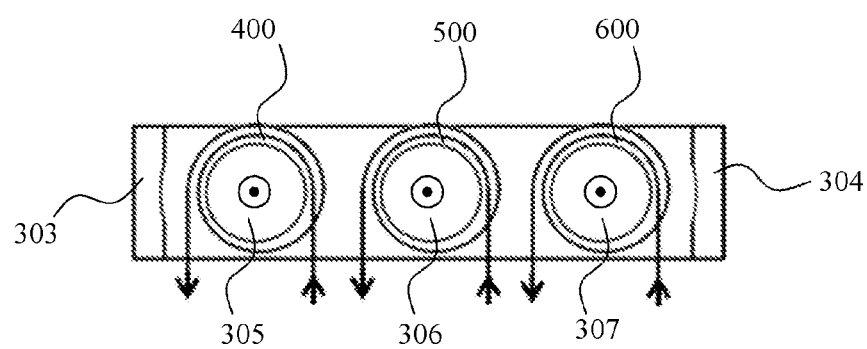
FIG. 7B is a top view of the integrated inductor shown in FIG. 7A.

FIG. 7A and FIG. 7B show the structure of another embodiment of the integrated inductor of the present disclosure that differs from the integrated inductor illustrated in FIGS. 5A and 5B. The integrated inductor contains three central columns, i.e., first central column 305, second central column 306 and third central column 307, and three windings, i.e., first winding 400, second winding 500, and third winding 600, thereby forming three inductors, i.e., the first inductor $L_A$, the second inductor $L_B$ and the third inductor $L_C$.

Figure 7C:
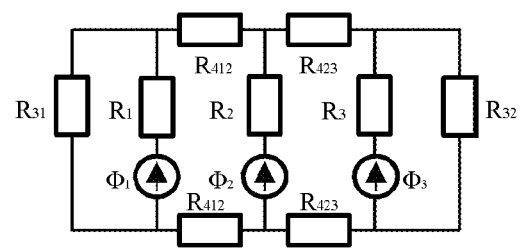
FIG. 7C is a diagram of the equivalent magnetic circuit of the integrated inductor shown in FIG. 7A.
Figure 7D:
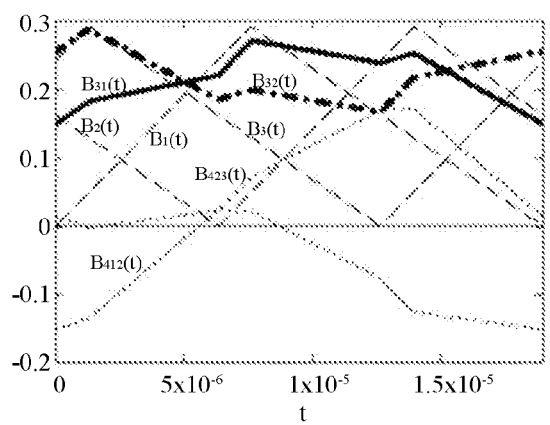
FIG. 7D is a graph of the flux density distribution in time sequence of the integrated inductor shown in FIG. 7A.

Referring to FIG. 7A, FIG. 7C and FIG. 7D, $R_{31}$ is the reluctance between the first side column 303 and the first central column 305, the reluctance between the third central column 307 and the second side column 304 is $R_{32}$, the reluctance of the first central column 305 is $R_1$, the reluctance of the second central column 306 is $R_2$, the reluctance of the third central column 307 is $R_3$, and the reluctance between the first central column 305 and the second central column 306 is $R_{412}$ and the reluctance between the second central column 306 and the third central column 307 is $R_{423}$.

The three windings wound on the three central columns accordingly are electrically coupled in parallel and each has a first terminal and a second terminal. When a reference current flows from the first terminal of the winding and out of the second terminal, the reference current on the first inductor $L_A$ produces a first reference magnetic field, the reference current on the second inductor $L_B$ produces a second reference magnetic field, and the reference current on the third inductor $L_C$ produces a third reference magnetic field; the first reference magnetic field, the second reference magnetic field, and the third reference magnetic field have the same direction. The high-frequency current components of the operating currents in the three windings and the magnetic fluxes produced by them are in a phase difference of 120 degrees by each other, the phase difference allows a deviation of +/−5 degrees.

Since the first magnetic flux $\Phi_1$, the second magnetic flux $\Phi_2$ and the third magnetic flux $\Phi_3$ excited by the high-frequency current components of the operating currents flow across the side column and then at least partially cancel each other, the flux density generated by the high-frequency current components varies with time as shown in FIG. 7D. Similar to the analysis of FIG. 5E and FIG. 6C, $B_{31}(t)$ and $B_{32}(t)$ on the side columns are calculated by superimposing the magnetic fluxes $\Phi_1$, $\Phi_2$ and $\Phi_3$ of the high-frequency components after distributing them according to the reluctance model, resulting in a significant reduction of the ripple of magnetic flux or magnetic flux density on the side columns and thus a reduction in the core loss on the side columns.

Taking into account the core loss of the magnetic element as well as the producing process and the product application, it is optimal to set the sum of the cross-sectional area of two side columns to ⅔ of the sum of cross-sectional areas of the three central columns in this embodiment. In other embodiments it is possible to set the sum of the two side columns to have a cross-sectional area greater than ½ of the sum of the three central columns.

In FIG. 7A, the integrated inductor of the present disclosure has three central columns. In some other embodiments, the number of central columns can be N, with N being an integer greater than 3, and accordingly the number of windings is also N, so that N inductors can be formed, i.e., N inductors can be integrated into one core to form an integrated inductor. N magnetic fields in N inductors have the same reference direction, and the phase difference between the high-frequency components of operating currents flowing in the inductors is 360°/N, the phase difference allows a deviation of +/−5 degrees.

The other structures of the integrated inductor embodiment shown in FIG. 7A are essentially the same as the integrated inductor shown in FIG. 5A and will not be repeated here.

The integrated inductor of present disclosure can be applied to a variety of power conversion modules, as described by the following examples.

Figure 8A:
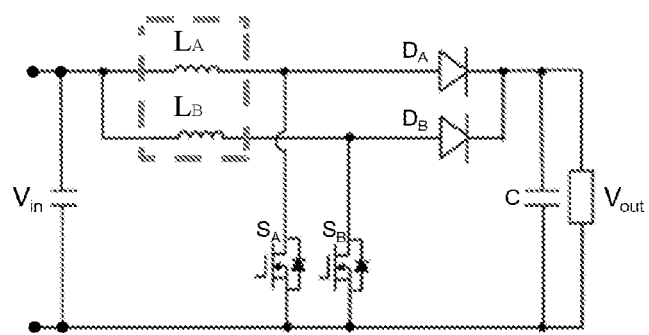
FIG. 8A is a topology diagram of an embodiment of the power conversion module of the present disclosure.

Referring to FIG. 8A, FIG. 8A is a topology diagram of an embodiment of the power conversion module of the present disclosure. The power conversion module comprises an input side $V_{in}$, power conversion circuits and an output side $V_{out}$.

The input side $V_{in}$ is used to receive an input voltage, and the output side $V_{out}$ is used to output an output voltage. The power conversion circuit is electrically coupled to the input side $V_{in}$ and is used to convert the input voltage to an output voltage. The power conversion circuit is, for example, a two-branch interleaved parallel Boost circuit comprising two parallel branches, the first branch comprises an inductor $L_A$, a switch $S_A$ electrically coupled to the inductor $L_A$, and a diode $D_A$ electrically coupled to the switch $S_A$; the second branch comprises an inductor $L_B$, a switch $S_B$ electrically coupled to the inductor $L_B$, and a diode $D_B$ electrically coupled to the switch $S_B$. The inductor $L_A$, the switch $S_A$ and the diode $D_A$ electrically coupled to a common node; the inductor $L_B$, the switch $S_B$, and the diode $D_B$ electrically coupled to a common node. The inductor $L_A$ and the inductor $L_B$ are integrated into one inductor shown in FIG. 5A of the present disclosure.

Figure 8B:
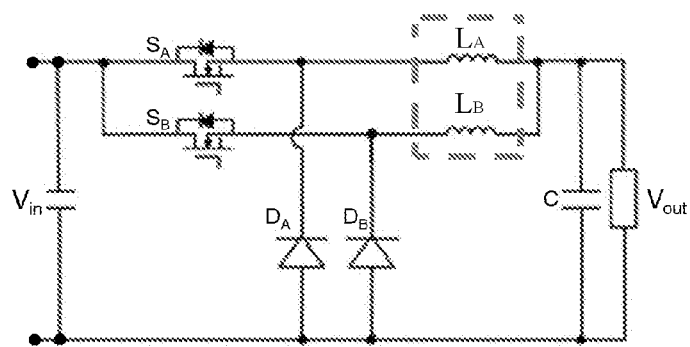
FIG. 8B is a topology diagram of another embodiment of the power conversion module of the present disclosure.
Figure 8C:
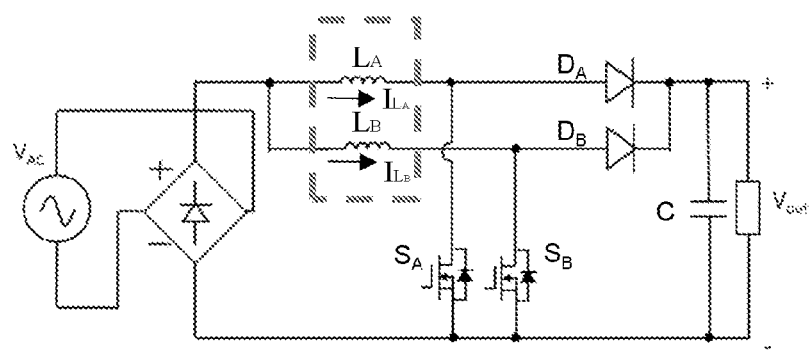
FIG. 8C is a topology diagram of another embodiment of the presently disclosed power conversion module.

In the power conversion module of this embodiment, the power conversion circuit can also be a Buck circuit with two interleaved parallel connections, as shown in FIG. 8B, or a power factor correction (PFC) circuit with two interleaved parallel connections, as shown in FIG. 8C.

Figure 8D:
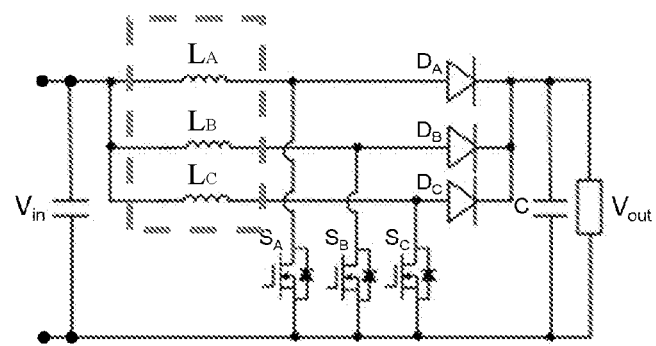
FIG. 8D is a topology diagram of another embodiment of the power conversion module of the present disclosure.

Referring to FIG. 8D, FIG. 8D is a topology diagram of another exemplary embodiment of the power conversion module of the present disclosure.

The input side $V_{in}$ is used to receive an input voltage; the output side $V_{out}$ is used to output an output voltage; the power conversion circuit is electrically coupled to the input side $V_{in}$ and is used to convert the input voltage to an output voltage. The power conversion circuit is, for example, a three-branch interleaved parallel Boost circuit comprising three parallel branches, the first branch comprises an inductor $L_A$, a switch $S_A$ electrically coupled to the inductor $L_A$, and a diode $D_A$ electrically coupled to the switch $S_A$; the second branch comprises an inductor $L_B$, a switch $S_B$ electrically coupled to the second inductor and a diode $D_B$ electrically coupled to the switch $S_B$; the third branch comprises an inductor $L_C$, a switch $S_C$ electrically coupled to the inductor $L_C$ and a diode $D_C$ electrically coupled to the switch $S_C$. The inductor $L_A$, the switch $S_A$, and the diode $D_A$ are electrically coupled to a common node; the inductor $L_B$, the switch $S_B$, and the diode $D_B$ are electrically coupled to a common node; the inductor $L_C$, the switch $S_C$, and the diode $D_C$ are electrically coupled to a common node. The inductor $L_A$, the inductor $L_B$ and the inductor $L_C$ are integrated into an inductor shown in FIG. 7A of the present disclosure.

Figure 8E:
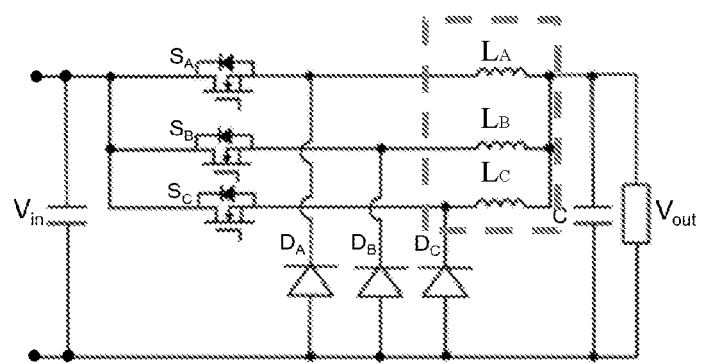
FIG. 8E is a topology diagram of another embodiment of the power conversion module of the present disclosure.
Figure 8F:
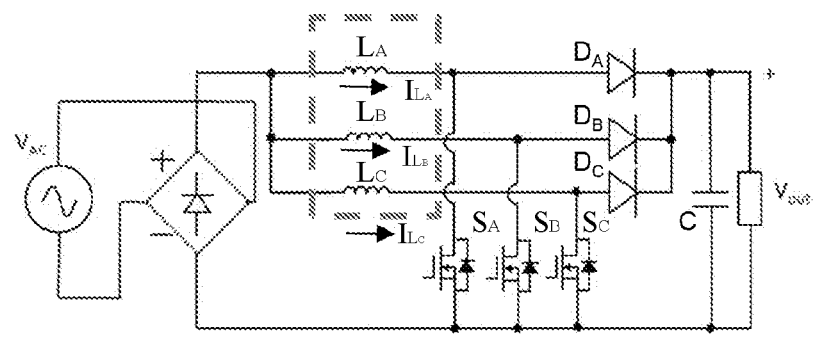
FIG. 8F is a topology diagram of another embodiment of the presently disclosed power conversion module.

In the power conversion module of this embodiment, the power conversion circuit can also be a three-branch interleaved parallel Buck circuit, as shown in FIG. 8E, or a three-branch interleaved parallel power factor correction circuit, as shown in FIG. 8F.

From FIG. 8A-8F, all the diodes can be replaced by switches, i.e. MOSFET. In addition, the integrated inductor is recommended to work in CRM mode or DCBM current mode (i.e., critical current conduction mode).

In some other embodiments, the power conversion circuit in the power conversion module may be an N-branch interleaved parallel Buck circuit or an N-branch interleaved parallel Boost circuit or an N-branch interleaved parallel power factor correction circuit, wherein N is an integer greater than three. The N inductors in the N-branch interleaved parallel power conversion circuit may be an integrated inductor containing N inductors as described hereinbefore in this disclosure.

Transformer-Integrated Magnetic Element

With reference to FIG. 3A to FIG. 3B, the transformer-integrated magnetic element in this embodiment of the disclosure may substantially have the same structure as the transformer-integrated magnetic element used in the multiple parallel-connected resonant converter according to the embodiment of the present disclosure, and thus will not further described herein. The core shown in FIG. 2A to FIG. 2d may also be used in the transformer-integrated magnetic element.

It is noted that the transformer-integrated magnetic element not only can be used in the multiple parallel-connected resonant converter, but also can be used in other power supply circuit, for example, can be used in dual or multiple forward-type converter, phase shifted full bridge converter, flyback converter or the like.

The exemplary embodiments of the present disclosure have been shown and described above. It should be understood that the present disclosure would never be limited to the disclosed embodiments, rather, the present disclosure is intended to cover various modification and equivalent arrangement fallen within the spirit and scope of the attached claims.

What is claimed is:

1. An integrated inductor, comprising:
a magnetic core, comprising:
an upper cover plate and a bottom cover plate, wherein the upper cover plate is disposed opposite to the bottom cover plate;
a first side column and a second side column, provided between the upper cover plate and the bottom cover plate; and
a first central column and a second central column, provided between the upper cover plate and the bottom cover plate, wherein the first central column and the second central column are disposed between the first side column and the second side column, and the first side column and the second side column align with the first central column and the second central column; and
a first winding and a second winding electrically coupled to each other in parallel, wherein the first winding is wound around the first central column, forming a first inductor, the second winding is wound around the second central column, forming a second inductor, each of the first winding and the second winding has a first terminal and a second terminal,
wherein a magnetic field generated by a reference current on the first central column has a first magnetic flux direction when the reference current flows from the first terminal of the first winding to the second terminal of the first winding, and a magnetic field generated by an identical reference current on the second central column has a second magnetic flux direction when the identical reference current flows from the first terminal of the second winding to the second terminal of the second winding, the second magnetic flux direction is the same as the first magnetic flux direction; and
wherein a first operating current flowing through the first winding has a first high-frequency current component, and a second operating current flowing through the second winding has a second high-frequency current component, and a phase difference is 180 degrees between the first high-frequency current component and the second high-frequency current component, fluxes generated by the first high-frequency current component and the second high-frequency current component at the first side column cancel each other, and fluxes generated by the first high-frequency current component and the second high-frequency current component at the second side column cancel each other, wherein the first side column and the second side column have the same cross sectional areas, and the first central column and the second central column have the same cross sectional areas, and a sum of the cross sectional areas of the first side column and the second side column is greater than or equal to ½ of a sum of the cross sectional areas of the first central column and the second central column.

2. The integrated inductor according to claim 1, wherein the first operating current flowing through the first winding further comprises a direct current component or a low-frequency current component, the second operating current flowing through the second winding further comprises a direct current component or a low-frequency current component, and the direct current component or the low-frequency current component in the first winding is equal to the direct current component or the low-frequency current component in the second winding.

3. The integrated inductor according to claim 1, wherein the coupling coefficient of the first inductor and the second inductor is less than or equal to 0.1.

4. The integrated inductor according to claim 1, wherein the first central column has a first air gap, and the second central column has a second air gap, a length of the first air gap is equal to a length of the second air gap.

5. The integrated inductor according to claim 1, wherein the first winding and the second winding have the same turns, and an inductance of the first inductor is equal to an inductance of the second inductor.

6. A power conversion module, comprising:
an input side, configured to receive an input voltage;
a power conversion circuit, electrically coupled to the input side for converting the input voltage to an output voltage, wherein the power conversion circuit comprises two branches electrically parallel to each other, and each branch comprises an inductor, a first switch and a second switch, and wherein the inductor, the first switch and the second switch are electrically coupled to a common node; and
an output side, configured to output the output voltage from the power conversion circuit;
wherein the inductor of one of the two branches and the inductor of another of the two branches are designed to the integrated inductor according to claim 1.

7. The power conversion module according to claim 6, wherein the power conversion circuit comprises two interleaved parallel Buck circuits or two interleaved parallel Boost circuits or two interleaved parallel power factor correction (PFC) circuits.

8. An integrated inductor, comprising:
a magnetic core, comprising:
an upper cover plate and a bottom cover plate, wherein the upper cover plate is disposed opposite to the bottom cover plate;
a first side column and a second side column, provided between the upper cover plate and the bottom cover plate; and
N central columns, provided between the upper cover plate and the bottom cover plate, wherein the N central columns are disposed between the first side column and the second side column, and the N central columns align with the first side column and the second side column, N is greater than or equal to three; and
N windings electrically coupled to each other in parallel, wherein N windings are wound around the N central columns one by one, forming N inductors, each of the N windings has a first terminal and a second terminal,
wherein a reference magnetic flux direction is defined by a reference current flowing from the first terminal to the second terminal of each of the N windings, the reference magnetic flux directions generated by an identical reference current flowing through each of the N windings are the same; and
wherein each operating current flows through one of the N windings comprises a corresponding high-frequency current component, a phase difference between high-frequency current components of the operating currents flowing through N windings is 360°/N, fluxes generated by N high-frequency current component at the first side column cancel each other, and fluxes generated by N high-frequency current component at the second side column cancel each other,
wherein the cross sectional areas of the two side columns are equal, the cross sectional areas of the N central columns are equal, and a sum of the areas of the two side columns is greater than or equal to ½ of a sum of the cross sectional areas of the N central columns.

9. The integrated inductor according to claim 8, wherein each operating current flows through one of the N windings are further comprises a direct current component or a low-frequency current component, and the direct current components or the low-frequency current components flowing in N windings are equal.

10. The integrated inductor according to claim 8, wherein the coupling coefficient of the N inductors is less than or equal to 0.1.

11. The integrated inductor according to claim 8, wherein each of N central columns has an air gap, and length of the air gaps of the N central columns are equal.

12. The integrated inductor according to claim 8, wherein the N windings have the same turn, and the inductance of the inductors are equal.

13. The integrated inductor according to claim 8, wherein when N is equal to 3, a sum of the cross sectional areas of two side columns is equal to ⅔ of a sum of the cross-sectional areas of three central columns.

14. A power conversion module, comprising:
an input side, configured to receive an input voltage;
an output side, configured to output an output voltage; and
a power conversion circuit, electrically coupled to the input side for converting the input voltage to the output voltage, wherein the power conversion circuit comprises N parallel branches, and each branch comprises an inductor, a first switch and a second switch, wherein the inductor, the first switch and the second switch are electrically coupled to a common node, wherein N is equal to or greater than 3; and
wherein the N inductors of the N parallel branches are made of the integrated inductor according to claim 8.

15. The power conversion module according to claim 14, wherein the power conversion circuit comprises N interleaved parallel Buck circuits or N interleaved parallel Boost circuits or N interleaved parallel power factor correction (PFC) circuits.

* * * * *